J. H. LEITCH.

AUTOMATIC ACCELERATOR.

APPLICATION FILED JUNE 18, 1917.

Reissued Aug. 2, 1921. 15,170.

Inventor

John H. Leitch

By Whittemore, Hulbert & Whittemore

Attorneys

UNITED STATES PATENT OFFICE.

JOHN H. LEITCH, OF DETROIT, MICHIGAN, ASSIGNOR OF ONE-HALF TO ANTHONY NELSON, OF DETROIT, MICHIGAN.

AUTOMATIC ACCELERATOR.

15,170. Specification of Reissued Letters Patent. Reissued Aug. 2, 1921.

Original No. 1,222,874, dated April 17, 1917, Serial No. 117,971, filed September 1, 1916. Application for reissue filed June 18, 1917. Serial No. 175,501.

*To all whom it may concern:*

Be it known that I, JOHN H. LEITCH, a citizen of the United States of America, residing at Detroit, in the county of Wayne and State of Michigan, have invented certain new and useful Improvements in Automatic Accelerators, of which the following is a specification, reference being had therein to the accompanying drawings.

This invention relates to accelerators for motor vehicles and the primary object of my invention is to provide a device that can be easily and quickly installed to be automatically actuated to prevent an automobile engine from stalling and also prevent unnecessary racing, thereby producing a monetary saving as gasolene is economically used.

Another object of my invention is to provide an accelerator adapted to be operated in synchronism with either the clutch or reverse pedals of an automobile, the device being used in conjunction with the ordinary gas throttle control of the steering post, but without effecting or interfering with that control.

A still further object of my invention is to provide a device of type that can be advantageously used in connection with the well known type of "Ford" automobiles and operated by inexperienced drivers.

The device includes parts that are constructed with a view of reducing the cost of manufacture and at the same time retain those features by which simplicity, durability and ease of assembly are secured.

With such ends in view, my invention resides in the novel construction, combination and arrangements of parts to be hereinafter specifically described and then claimed.

Reference will now be had to the drawing, wherein—

Figure 1:
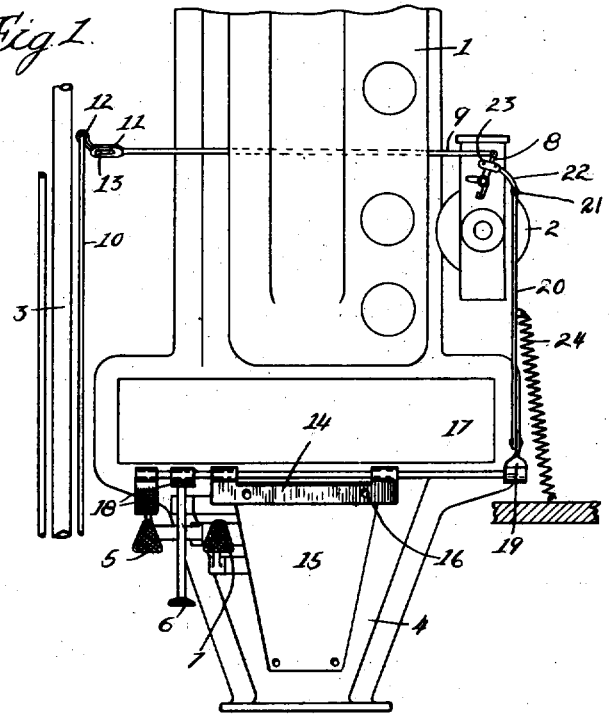
Figure 1 is a plan of the device.
Figure 2:
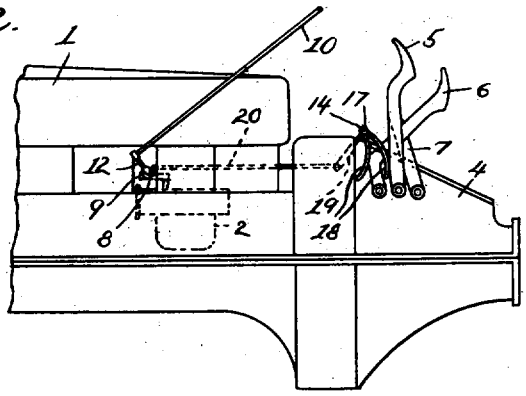
Fig. 2 is a side elevation of the same.

In the drawings, 1 denotes a portion of an internal combustion engine associated with a carbureter 2, a steering post or column 3, a clutch and change speed gear casing 4, and clutch, reverse and brake pedals or treadles, 5, 6 and 7 respectively. All of these elements have been diagrammatically illustrated, and the carbureter 2 has the usual throttle valve crank 8 connected by a rod 9 to an accelerator rod 10 forming part of the steering column or steering post 3.

The device which I install for automatically accelerating the operation of the engine 1 by shifting the throttle valve crank 8 is adapted for operation independent of the accelerator rod 10, therefore, I provide an end of the rod 9 with a slot 11 to receive a connecting pin 13 of a crank 12 on the end of the rod 10, such connection permitting of the throttle valve crank 8 being actuated without disturbing the rod 10.

My device comprises a double bearing member 14 connected to a cover plate 15 of the change speed gear casing 4 by the same screw bolts or fastening means 16 that retain the cover plate upon the casing. Journaled in the double bearing member 14 is a rock shaft 17, said shaft extending in proximity to the pedals 5 and 6 to receive curved adjustable levers 18 adapted to be engaged by the pedals 5 and 6 when depressed.

The curved levers 18 are set relative to the rock shaft 17 whereby said levers will normally bear against the clutch and reverse pedals 5 and 6, so that the least actuation of these pedals will rock the shaft 17.

Fixed upon the opposite end of the rock shaft 17 is a crank 19 and pivotally connected to said crank is a reach rod 20. This rod extends forwardly over the carbureter 2 and is pivotally connected, as at 21, to a curved arm 22 connected to the throttle valve crank 8 by clamping member 23 or other fastening means, so that the arm 22 is rigid relative to the throttle valve crank 8.

The reach rod 20 is suitably connected by a coiled retractile spring 24 to the dash board of an automobile or to any other suitable part thereof, so that the force of the spring will only restore the device to normal position.

In operation, the low speed forward or reverse can be thrown in and at the same time automatically accelerate the engine which permits of the driver of the automobile getting under way without disturbing the accelerating rod 10 of the steering column. The instant the pedals are in neutral or the clutch pedal back in the high gear, the engine runs normal, or at a speed determined by operating the accelerating rod 10 of the steering column. It is therefore apparent that by properly operating the clutch or reverse pedal that racing of the engine is eliminated and it is quite impossible for an inexperienced operator to stall the engine.

It is to be understood that in the "Ford" type of automobile low speed is attained by depression of the pedal 5 and high speed by the release of said pedal, while it is necessary to hold the pedal in central position to release the clutch for the operation of the companion pedal. Consequently whenever it is desired to reverse, the pedal 5 must be held in central position while the pedal 6 is depressed to throw in reverse. This precludes the use of an accelerator independently operated by the foot, such as in common use with other types of car, for the reason that both feet are occupied in the control of the pedals 5 and 6. However, with my improvement the same control is possible as with other types of car, and the operation of either of the pedals 5 and 6 will accomplish the automatic acceleration.

While in the drawing there is illustrated a preferred embodiment of my invention, it is to be understood that the structural elements are susceptible to such variations and modifications as fall within the scope of the appended claims.

What I claim as my invention is:

1. An accelerator for vehicles, comprising—in combination with an engine, a carbureter, a throttle valve crank, steering post means for actuating the crank, and clutch and reverse pedals—a bearing member mounted in proximity to said pedals, a rock shaft journaled in said bearing member, adjustable curved levers on one end of said shaft normally engaging under said pedals, and a connection between the opposite end of said shaft and said throttle valve crank so that the throttle valve crank may be actuated independent of any steering post means.

2. An accelerator for vehicles, comprising—in combination with an engine, a carbureter, a throttle valve crank, steering post means, adapted for actuating the crank, and clutch and reverse pedals,—a bearing member mounted in proximity to said pedals, a rock shaft journaled in said bearing members and having an end thereof extending under said pedals, adjustable levers on said rock shaft normally engaging said pedals, a crank carried by said rock shaft, an arm fixed on the throttle valve crank, a reach rod connecting said arm to the crank of said rock shaft, and means for holding said levers normally in engagement with said pedals.

3. In a motor vehicle, the combination with the engine and change speed gearing including means for controlling the operation of said change speed gearing to effect different changes, of a plurality of pedals for actuating said controlling means, said pedals requiring simultaneous operation to effect one of said changes, and an accelerator operated by either of said pedals as the controlling means is actuated, thereby to pick up the load.

In testimony whereof I affix my signature at Detroit, Wayne county, Michigan, this 13th day of June, 1917.

JOHN H. LEITCH.